United States Patent
Derby et al.

(10) Patent No.: US 10,430,892 B2
(45) Date of Patent: Oct. 1, 2019

(54) OBJECT BASED ENERGY USAGE AND TRACKING

(71) Applicant: Honeywell International Inc., Morris Plains, NJ (US)

(72) Inventors: Paul Derby, Minneapolis, MN (US); Hari Thiruvengada, Plymouth, MN (US); Henry Chen, Beijing (CN)

(73) Assignee: Honeywell International Inc., Morris Plains, NJ (US)

( * ) Notice: Subject to any disclaimer, the term of this patent is extended or adjusted under 35 U.S.C. 154(b) by 406 days.

(21) Appl. No.: 15/099,467

(22) Filed: Apr. 14, 2016

(65) Prior Publication Data

US 2016/0232617 A1    Aug. 11, 2016

Related U.S. Application Data

(62) Division of application No. 13/938,861, filed on Jul. 10, 2013, now abandoned.
(Continued)

(51) Int. Cl.
*G06Q 40/00* (2012.01)
*G06F 3/0488* (2013.01)
(Continued)

(52) U.S. Cl.
CPC .......... *G06Q 40/12* (2013.12); *G06F 1/1643* (2013.01); *G06F 1/1686* (2013.01);
(Continued)

(58) Field of Classification Search
CPC ........ G05B 23/02; G05B 15/02; G06Q 30/00; G05D 3/12; Y04S 10/54
(Continued)

(56) References Cited

U.S. PATENT DOCUMENTS 5,086,385 A  *  2/1992  Launey .............. G06F 3/04847
                                                340/6.11
5,886,697 A  *  3/1999  Naughton ............ H04L 12/282
                                                345/473
(Continued)

OTHER PUBLICATIONS

EnergyStar publication via www.archive.org (Year: 2011).*
(Continued)

*Primary Examiner* — Oluseye Iwarere
(74) *Attorney, Agent, or Firm* — Seager, Tufte & Wickhem LLP

(57) ABSTRACT

A method includes receiving a selection of a building via a touchscreen interface, identifying a plurality of rooms based on a stored data record associated with the selected building, populating the touchscreen interface with visual representations of the plurality of rooms of the selected building, receiving a selection of a room via the touchscreen interface, identifying a plurality of predefined objects associated with the selected room, providing a list of the plurality of predefined objects on the touchscreen interface in a manner facilitating selection of an asset for the selected room via the touchscreen interface, facilitating entry of make and model information of the selected asset via the touchscreen interface, and retrieving estimated energy usage information based on the make and model information of the selected asset from a database of building objects via a network connection.

16 Claims, 11 Drawing Sheets

Related U.S. Application Data

(60) Provisional application No. 61/670,020, filed on Jul. 10, 2012.

(51) Int. Cl.

| | | |
|---|---|---|
| *G06Q 10/06* | (2012.01) | |
| *G06Q 30/02* | (2012.01) | |
| *G06F 1/16* | (2006.01) | |
| *G06F 3/0486* | (2013.01) | |
| *G06F 3/0484* | (2013.01) | |
| *G06F 3/0482* | (2013.01) | |

(52) U.S. Cl.
CPC .......... *G06F 3/0482* (2013.01); *G06F 3/0486* (2013.01); *G06F 3/0488* (2013.01); *G06F 3/04842* (2013.01); *G06F 3/04883* (2013.01); *G06F 3/04886* (2013.01); *G06Q 10/0639* (2013.01); *G06Q 30/0224* (2013.01); *G06Q 40/10* (2013.01); *G06Q 40/123* (2013.12)

(58) Field of Classification Search
USPC .......... 340/3.1; 700/295, 83, 275; 705/38, 4
See application file for complete search history.

(56) References Cited

U.S. PATENT DOCUMENTS

| | | | | |
|---|---|---|---|---|
| 6,040,856 A | * | 3/2000 | Sakaegi | G06K 7/1092 348/231.6 |
| 6,967,565 B2 | * | 11/2005 | Lingemann | G05B 15/02 340/12.23 |
| 9,609,003 B1 | * | 3/2017 | Chmielewski | G06F 3/041 |
| 9,679,274 B1 | * | 6/2017 | Roth | G06Q 10/109 |
| 2001/0039506 A1 | * | 11/2001 | Robbins | G06Q 10/06 705/7.34 |
| 2004/0267385 A1 | * | 12/2004 | Lingemann | G05B 15/02 700/83 |
| 2005/0086158 A1 | * | 4/2005 | Clare | G06Q 30/02 705/38 |
| 2005/0090915 A1 | * | 4/2005 | Geiwitz | G05B 15/02 700/90 |
| 2006/0009863 A1 | * | 1/2006 | Lingemann | G05B 15/02 700/19 |
| 2006/0102089 A1 | * | 5/2006 | Edstrom, Jr. | A01K 1/031 119/246 |
| 2007/0203860 A1 | * | 8/2007 | Golden | G06Q 10/04 705/412 |
| 2009/0195349 A1 | * | 8/2009 | Frader-Thompson | G01D 4/002 340/3.1 |
| 2011/0245940 A1 | * | 10/2011 | Picco | H05B 33/0863 700/90 |
| 2012/0046859 A1 | * | 2/2012 | Imes | H02J 13/001 701/409 |
| 2012/0053740 A1 | * | 3/2012 | Venkatakrishnan | G06F 1/3203 700/291 |
| 2012/0064923 A1 | * | 3/2012 | Imes | G05B 15/02 455/457 |
| 2012/0192076 A1 | * | 7/2012 | Rocca | G06Q 10/06311 715/738 |
| 2013/0109406 A1 | * | 5/2013 | Meador | H04L 67/125 455/456.1 |
| 2013/0144546 A1 | * | 6/2013 | Brackney | G06F 17/5004 702/61 |
| 2013/0257315 A1 | * | 10/2013 | Restrepo | H05B 37/0209 315/362 |
| 2013/0268899 A1 | * | 10/2013 | Valentino | G06Q 10/02 715/852 |
| 2013/0345882 A1 | * | 12/2013 | Dushane | G05B 15/02 700/276 |
| 2014/0005851 A1 | * | 1/2014 | Frei | H04L 29/1249 700/295 |
| 2014/0019319 A1 | | 1/2014 | Derby | |
| 2014/0059483 A1 | * | 2/2014 | Mairs | G06F 3/04817 715/788 |
| 2014/0244314 A1 | * | 8/2014 | Donald | G06Q 10/087 705/4 |
| 2014/0365120 A1 | * | 12/2014 | Vulcano | G01C 21/36 701/532 |

OTHER PUBLICATIONS

"U.S. Appl. No. 13/938,861, Advisory Action dated Nov. 5, 2015", 5 pgs.
"U.S. Appl. No. 13/938,861, Examiner Interview Summary dated Apr. 22, 2015", 3 pgs.
"U.S. Appl. No. 13/938,861, Final Office Action dated Aug. 17, 2015", 13 pgs.
"U.S. Appl. No. 13/938,861, Non Final Office Action dated Jan. 14, 2016", 17 pgs.
"U.S. Appl. No. 13/938,861, Non Final Office Action dated Jan. 30, 2015", 10 pgs.
"U.S. Appl. No. 13/938,861, Preliminary Amendment filed Nov. 8, 2013", 3 pgs.
"U.S. Appl. No. 13/938,861, Response filed Apr. 30, 2015 to Non Final Office Action dated Jan. 30, 2015", 27 pgs.
"U.S. Appl. No. 13/938,861, Response filed Oct. 19, 2015 to Final Office Action dated Aug. 17, 2015", 16 pgs.
"U.S. Appl. No. 13/938,861, Response filed Nov. 17, 2015 to Advisory Action dated Nov. 5, 2015", 19 pgs.
"EnergyStar", courtesy of Wayback Machine, (2011), 1 pg.

* cited by examiner

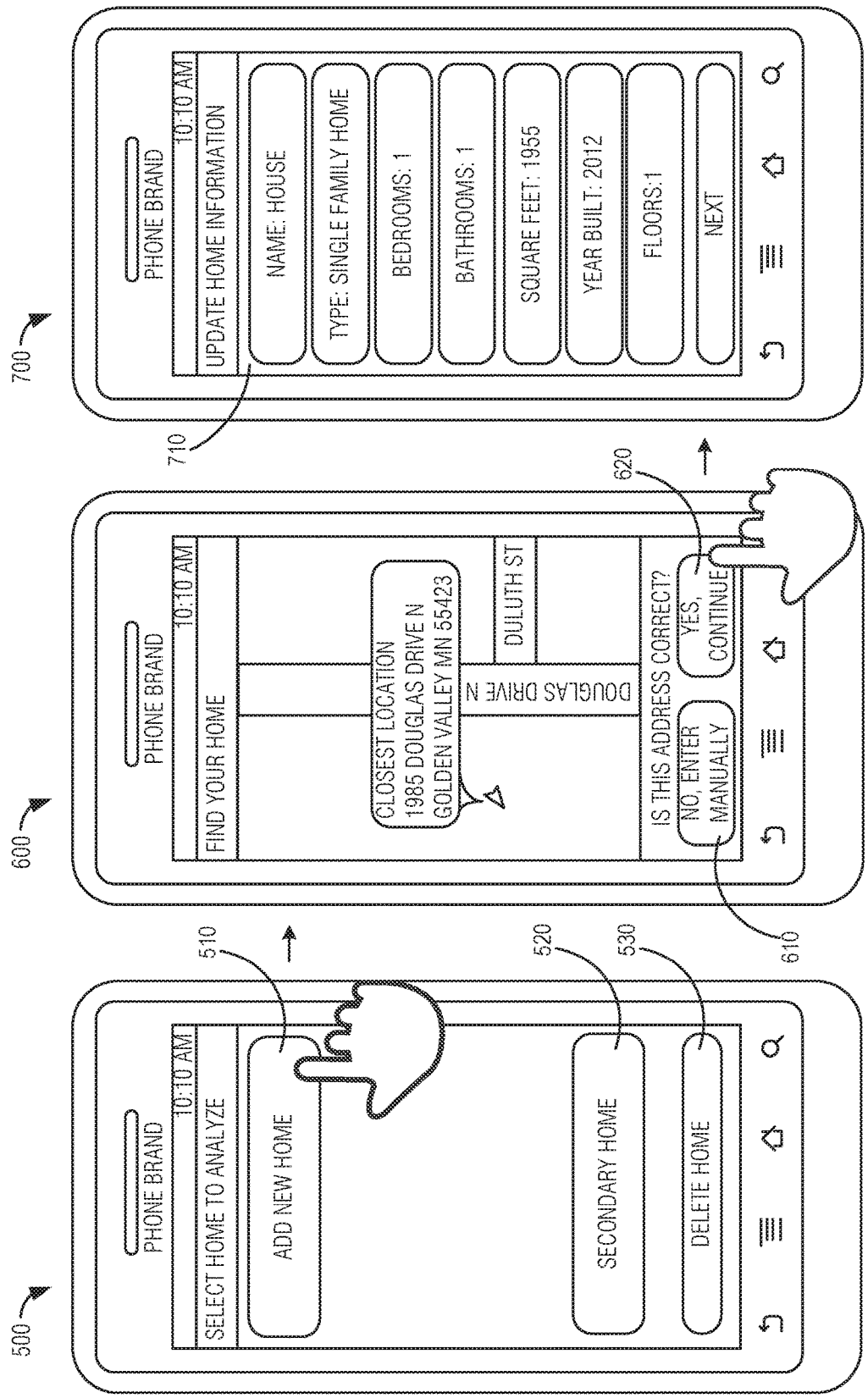

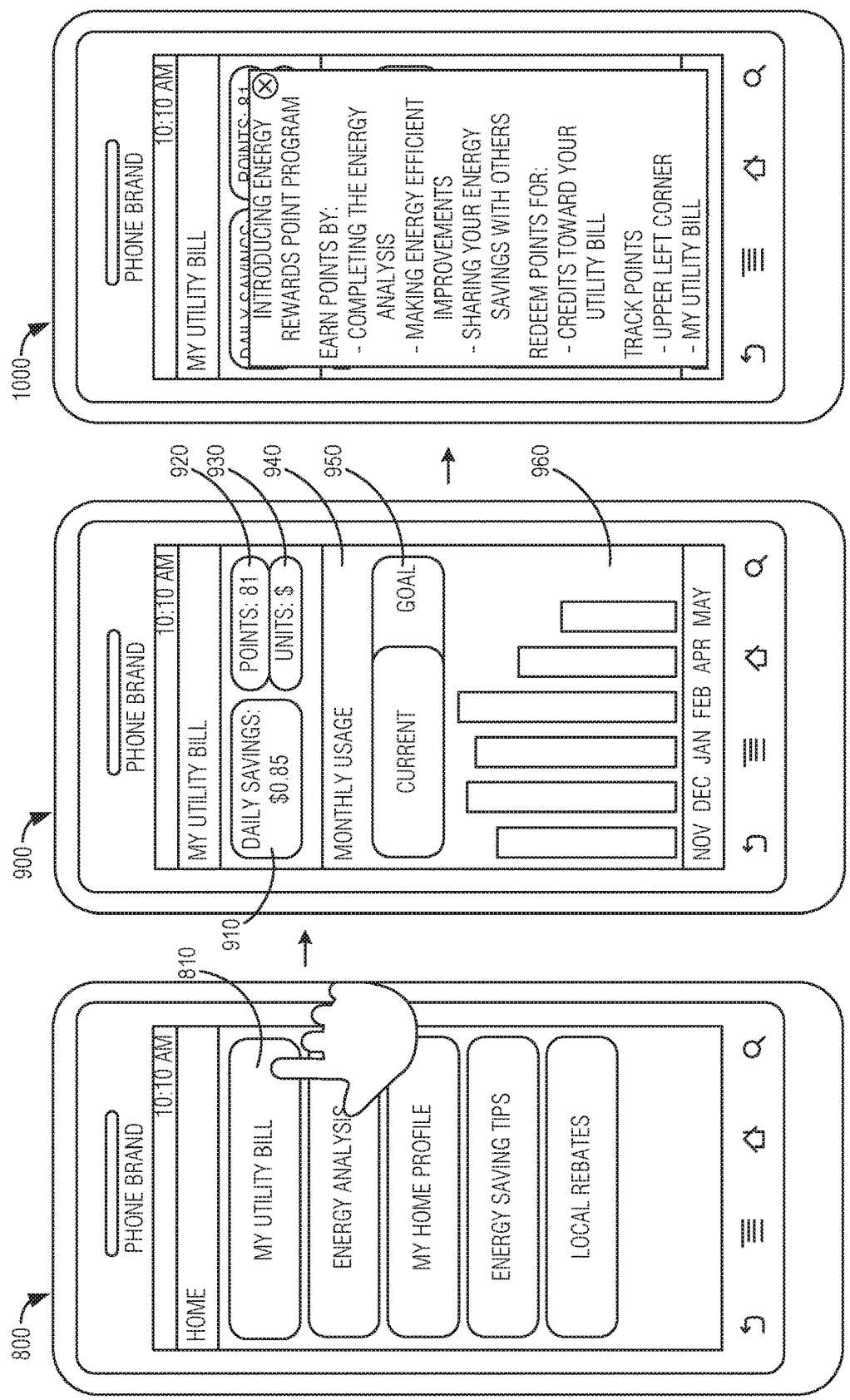

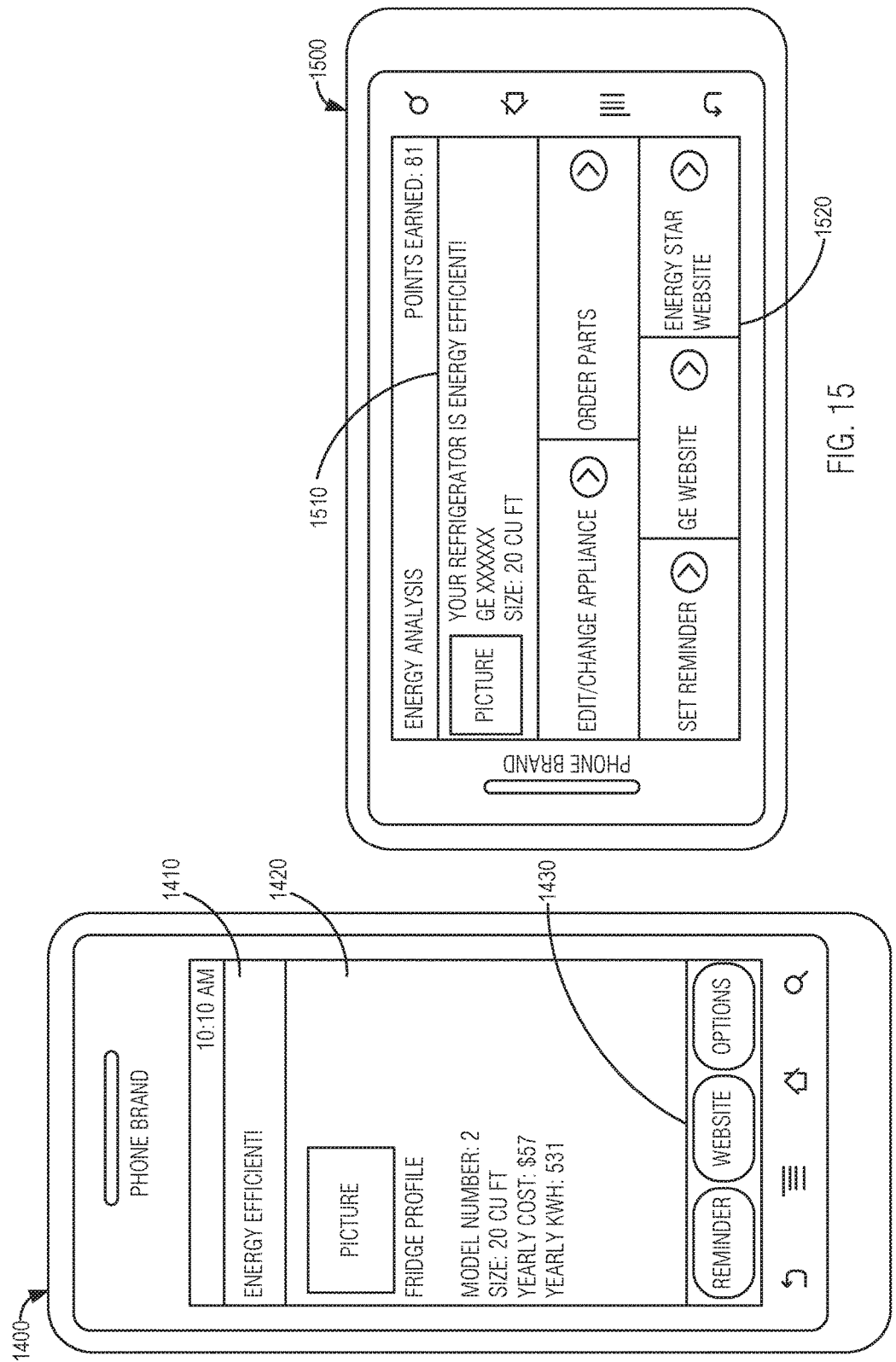

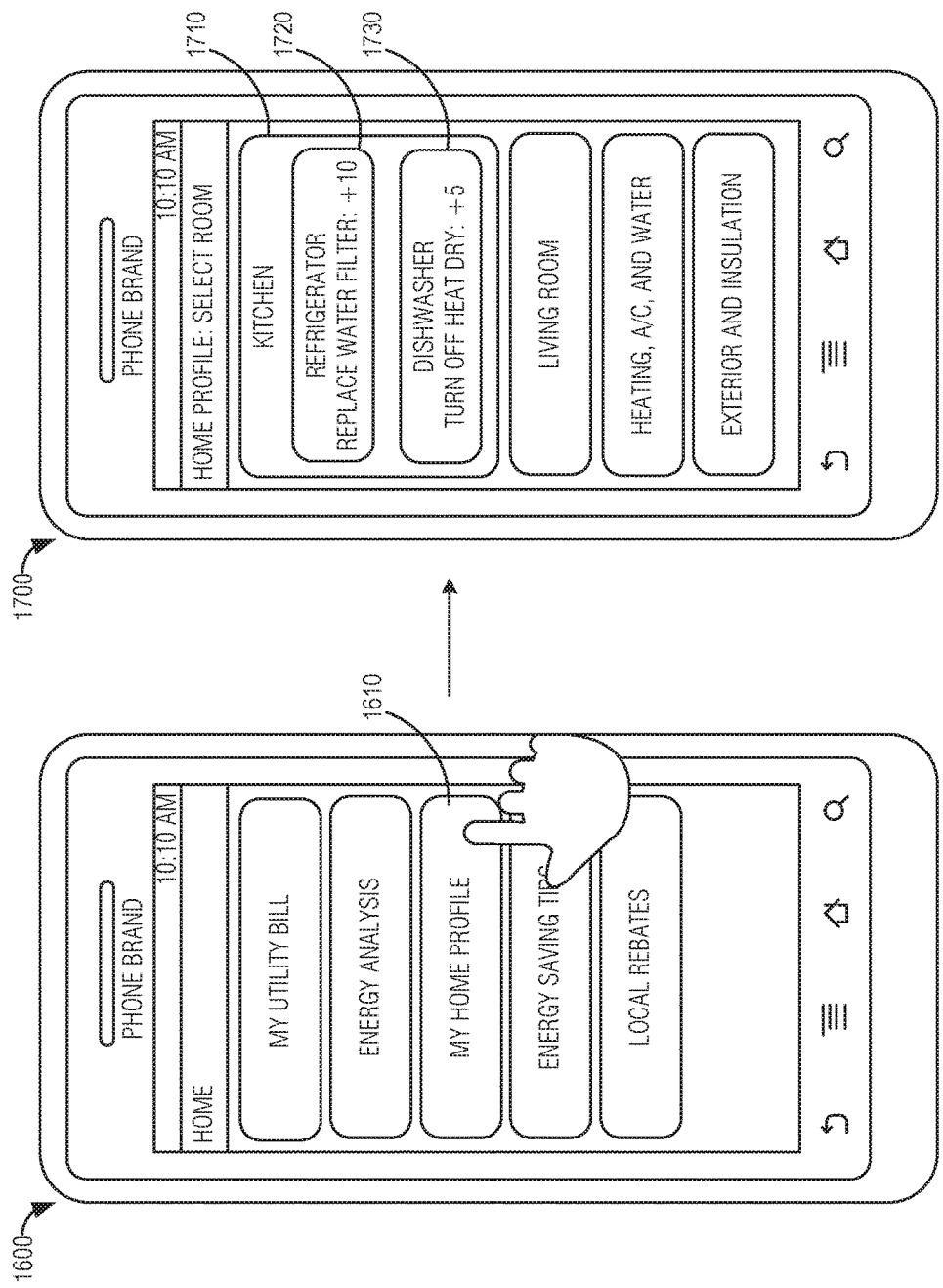

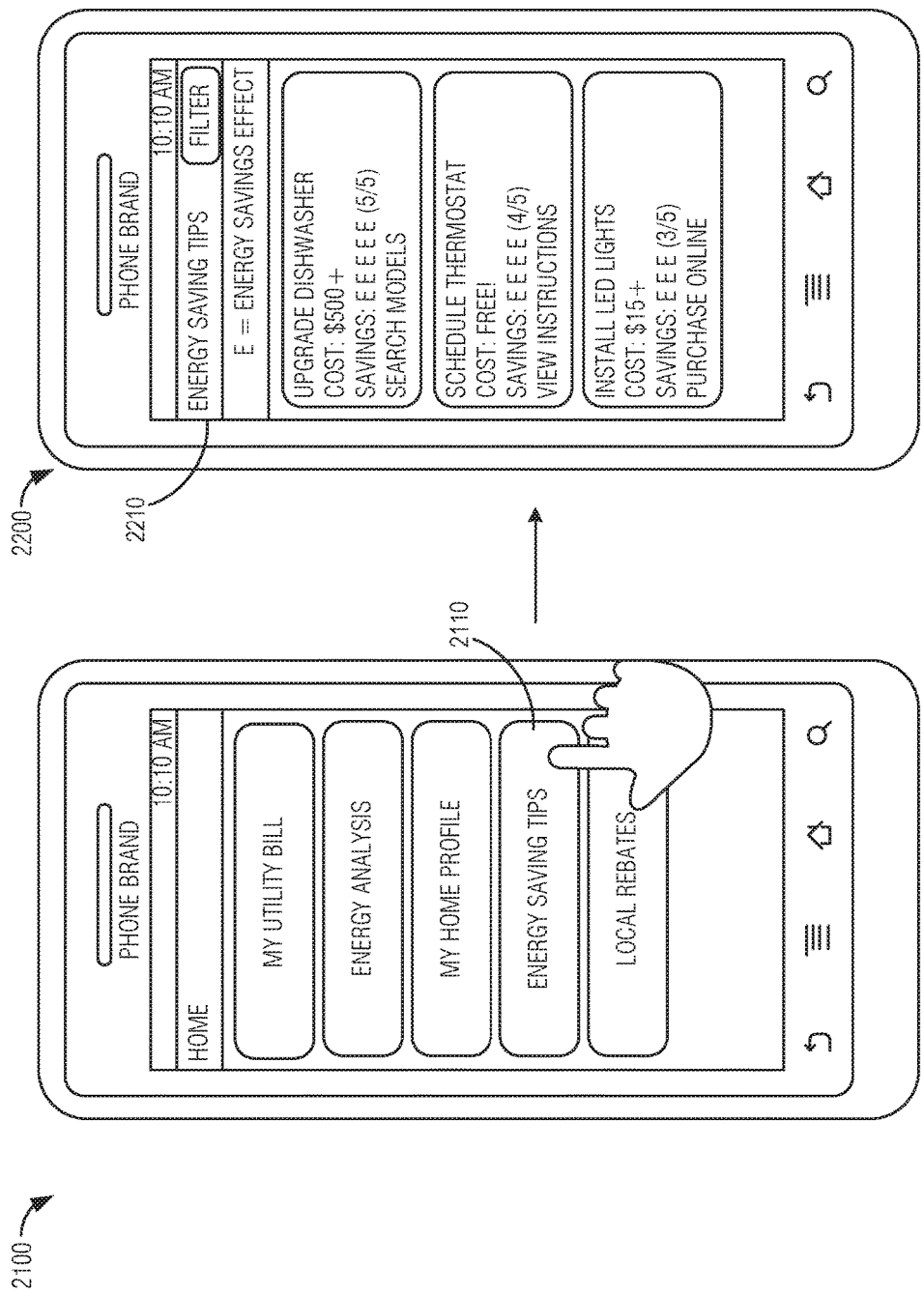

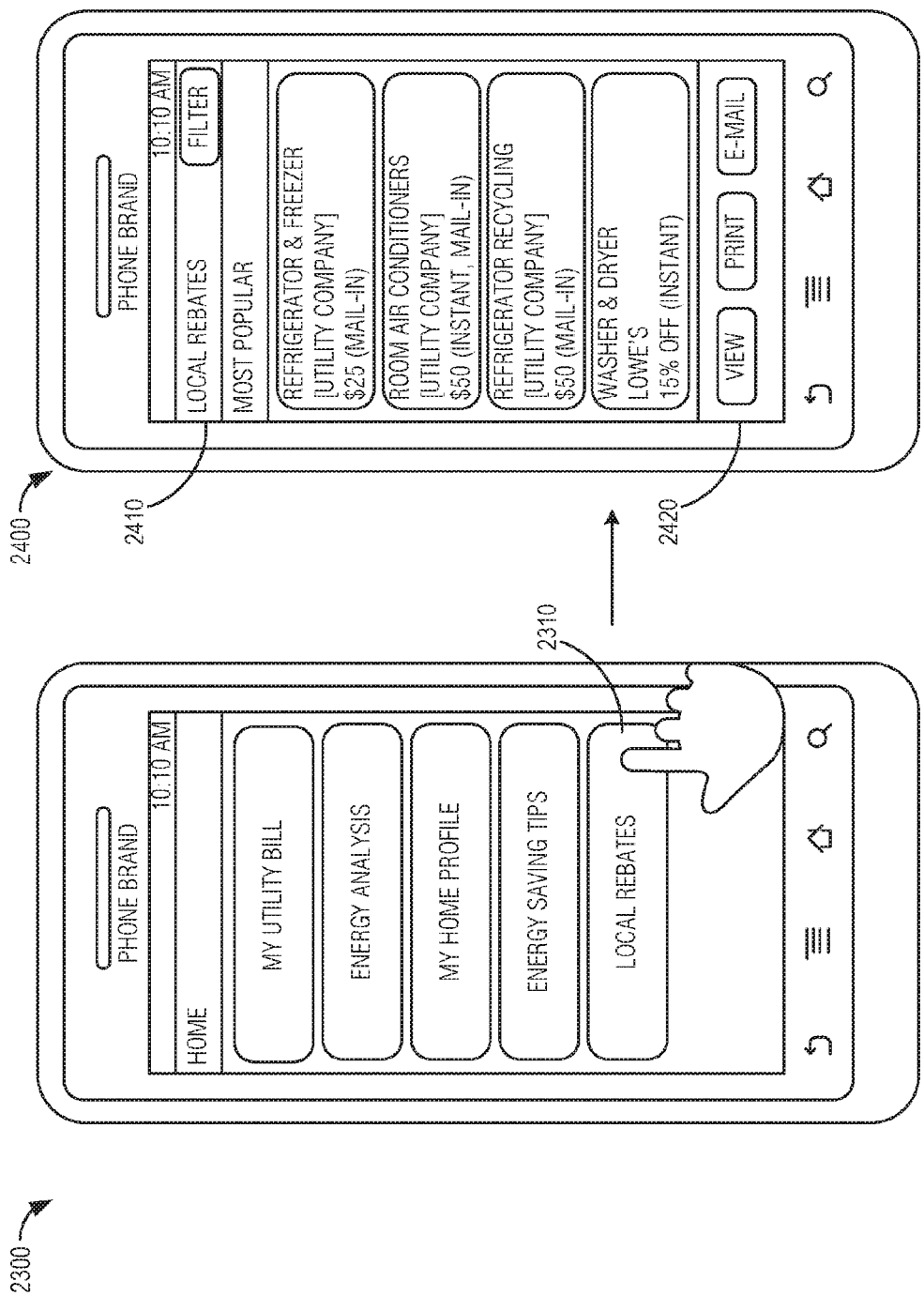

OBJECT BASED ENERGY USAGE AND TRACKING

CLAIM OF PRIORITY

This application is a continuation of U.S. patent application Ser. No. 13/938,861, filed on Jul. 10, 2013, which claims the benefit of priority of U.S. Provisional Patent Application Ser. No. 61/670,020, filed on Jul. 10, 2012, the disclosures of which are incorporated herein in their entirety by reference.

BACKGROUND

Typically, tablet or smart phone object tracking applications include list-based object tracking. In some examples, the user identifies objects by selecting or deselecting them in the order in which the application creator specifies them. Because objects in buildings are seldom arranged in the order specified by the application creator, the user must either walk from room to mom to accommodate the list or skip over items on the list to accommodate the layout of the building.

SUMMARY

A device, computer readable storage device having code, and method includes receiving a selection of a building via a touchscreen interface, identifying a plurality of rooms based on a stored data record associated with the selected building, populating the touchscreen interface with visual representations of the plurality of rooms of the selected building, receiving a selection of a room via the touchscreen interface, identifying a plurality of predefined objects associated with the selected room, providing a list of the plurality of predefined objects on the touchscreen interface in a manner facilitating selection of an asset for the selected room via the touchscreen interface, facilitating entry of make and model information of the selected asset via the touchscreen interface, and retrieving estimated energy usage information based on the make and model information of the selected asset from a database of building objects via a network connection.

BRIEF DESCRIPTION OF THE DRAWINGS

FIG. 5 shows phone-based home property management GUI according to an example embodiment.

FIG. 6 shows phone-based home locating GUI according to an example embodiment.

FIG. 7 shows phone-based home updating GUI according to an example embodiment.

FIG. 8 shows phone-based energy asset and audit management GUI My Utility Bill selection according to an example embodiment.

FIG. 9 shows phone-based utility bill display using the home customization GUI according to an example embodiment.

FIG. 10 shows phone-based Energy Rewards Point Program notification according to an example embodiment.

FIG. 14 shows phone-based asset profile GUI according to an example embodiment.

FIG. 15 shows phone-based asset profile post-audit actions GUI according to an example embodiment.

FIG. 16 shows phone-based energy asset and audit management GUI My Home Profile selection according to an example embodiment.

FIG. 17 shows phone-based My Home Profile portrait-mode GUI according to an example embodiment.

FIG. 21 shows phone-based energy asset and audit management GUI Energy Saving Tips selection according to an example embodiment.

FIG. 22 shows phone-based Energy Saving Tips GUI according to an example embodiment.

FIG. 23 shows phone-based energy asset and audit management GUI Local Rebates selection according to an example embodiment.

FIG. 24 shows phone-based energy asset and audit management rebate display and selection GUI according to an example embodiment.

DETAILED DESCRIPTION

Figure 1:
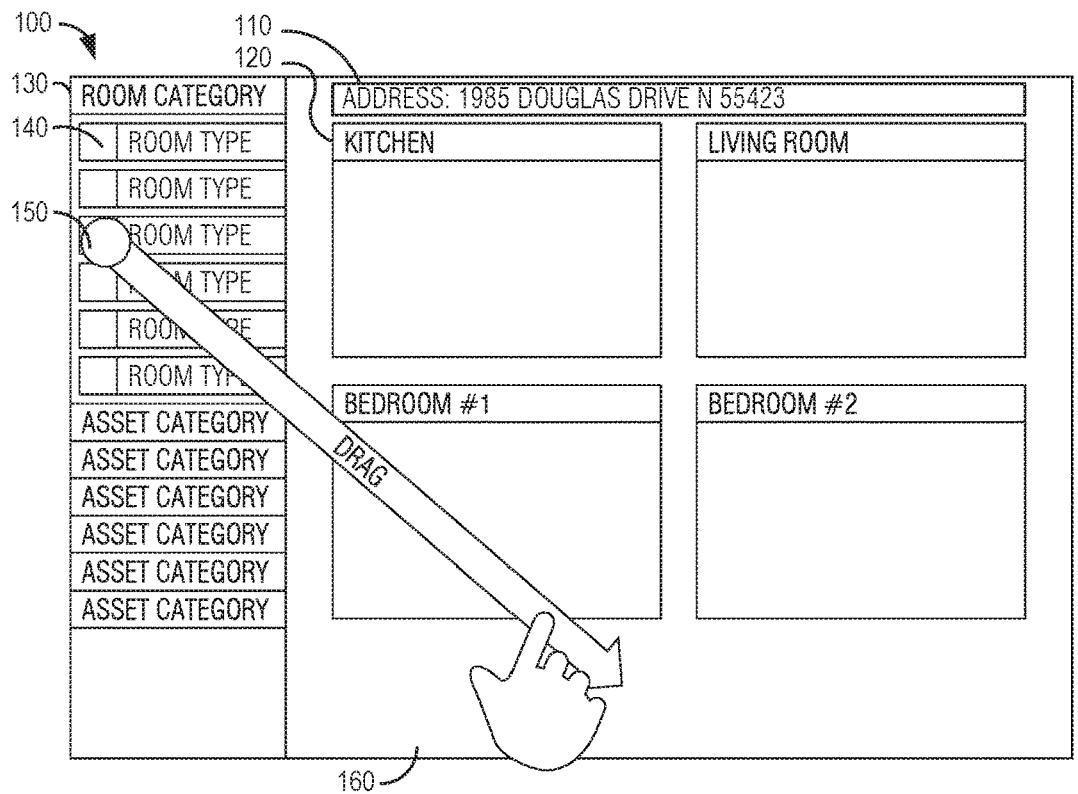
FIG. 1 shows tablet-based initial home customization using the home customization GUI according to an example embodiment.

In the following description, reference is made to the accompanying drawings that form a part hereof, and in which is shown by way of illustration specific embodiments that may be practiced. These embodiments are described in sufficient detail to enable those skilled in the art to practice the invention, and it is to be understood that other embodiments may be utilized and that structural, logical, and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software stored on storage devices, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

To date, there is not an off-the-shelf residential energy audit smart phone or tablet application that would allow the user to perform an audit in a flexible, self-directed fashion using a visual interface. Rather, users complete items within the energy audit in the order specified by the creator of the application, resulting in the user either skipping items in a list until moving to a different room, or moving back and forth between rooms, visiting each room as many times as required to complete the items in the order listed. In various embodiments, a mobile device-based interface allows the user to perform an energy audit using a touchscreen tablet device (e.g., iPad, Android tablet), smart phone, or other touchscreen device. The user is able to perform the residential energy audit on a mobile platform while taking advantage of touchscreen capabilities. If a tablet is used, the tablet's larger display may provide further advantage in performing an audit. The application may be downloaded and installed on a camera-enabled mobile device. The application is intended to be a part of or complement an application that may collect information about the assets within a consumer's home (e.g., energy audit application).

The room-based asset reporting and audit interface may include various features to facilitate asset reporting and auditing. For example, the interface may enable a user to log into an account hosted by a utility company or other service provider. The interface may enable a user to view a bill, view energy consumption (e.g., current or historical data points or charts), view energy consumptions savings, view energy points accrued, or view bill-pay status or options. The interface may enable a user to initiate the energy audi process, or to view the results of the energy audit process. The interface may enable a user to view energy-related rebates, incentives, or tax credits available in the geographical area of the user, such as tax credits issued by a utility company, government agency, or store. The interface may enable a user to view tips and home improvement ideas that are customized to the user by results of the energy audit. For example, using the make and model of a refrigerator, an energy-related tip about that refrigerator may be made available to the user. The interface may also enable a user to sort tips and home improvement ideas based on cost to implement, cost savings, or other criteria.

The room-based asset reporting and audit interface application may store data locally or remotely. The application may connect to a server connected through a local network or remote network (e.g., the internet, or "the cloud"). Data captured using the application may be stored in the server. The application may run in an online mode while connected to the remote server, or the application may run in an offline mode while not connected to the remote server. When the application is run in offline mode, the information may synchronize when the mobile device is able to connect to the remote server (e.g., when wireless internet is reconnected). Data collected throughout the energy audit process may be stored. When the user exits the application in the middle of the audit, the information may be stored temporarily, and subsequently the user may continue when the user reopens the application. The application may make remotely stored information available for other purposes (e.g., utility company data analytics, utility company database, utility company energy audit applications, etc.) The user may access his or her audit information from a different device, and the information may be viewed or editing by downloading or accessing the information from a new device.

FIGS. 1-4 show a home customization graphical user interface (GUI) 100-400 according to an example embodiment. The embodiments shown in FIGS. 1-4 provide a home customization GUI 100-400 that is applicable to any of the mobile devices that may be used to implement one or more of the described methods and interfaces. While the GUI may be described as being responsive to touchscreen input, other input methods may be used.

FIG. 1 shows tablet-based initial home customization 100 using the home customization GUI according to an example embodiment. As shown in FIG. 1, one embodiment of the initial home customization 100 includes a home address bar 110. The user may enter a partial or full address, which may be resolved against a list of addresses stored on a local drive or remote network. Once the user enters his/her address, the application extracts basic room information about the home from publically available tax records. The application then automatically creates templates 120 of those basic rooms for the user. If no tax record is found, then the application creates templates of some or all of the rooms. To add additional rooms, the user is able to select the "Room Category" menu 130, select the appropriate type of room 140 (e.g., bedroom, bathroom, etc.), and drag 150 the type of room to the room workspace 160. In some embodiments, the user may be able to create custom rooms not specified within the application.

Figure 2:
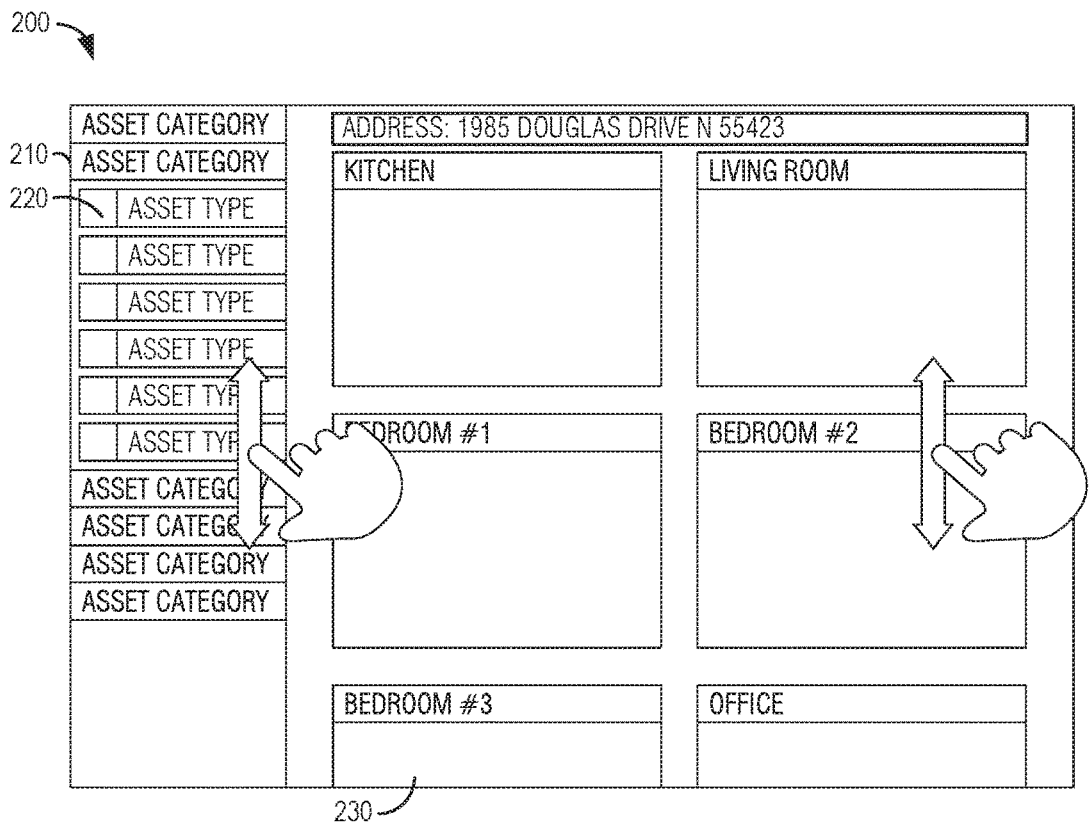
FIG. 2 shows tablet-based visual asset and room selection using the home customization GUI according to an example embodiment.

FIG. 2 shows tablet-based visual asset and room selection 200 using the home customization GUI according to an example embodiment. As shown in FIG. 2, one embodiment of the visual asset and room selection 200 includes the ability to scroll through and select asset categories 210. In an embodiment, the interface may contain a list of commonly available assets within a home (e.g., microwave). These assets may be embedded within asset categories (e.g., appliances). To expose the assets within a category, the user may select the asset category 210, and the visual asset and room selection 200 may expand a list of assets 220. For example, the asset category labeled "Appliances" may include a refrigerator, a dishwasher, and a washing machine. The visual asset and room selection 200 includes the ability to scroll through and select various rooms 230.

Figure 3:
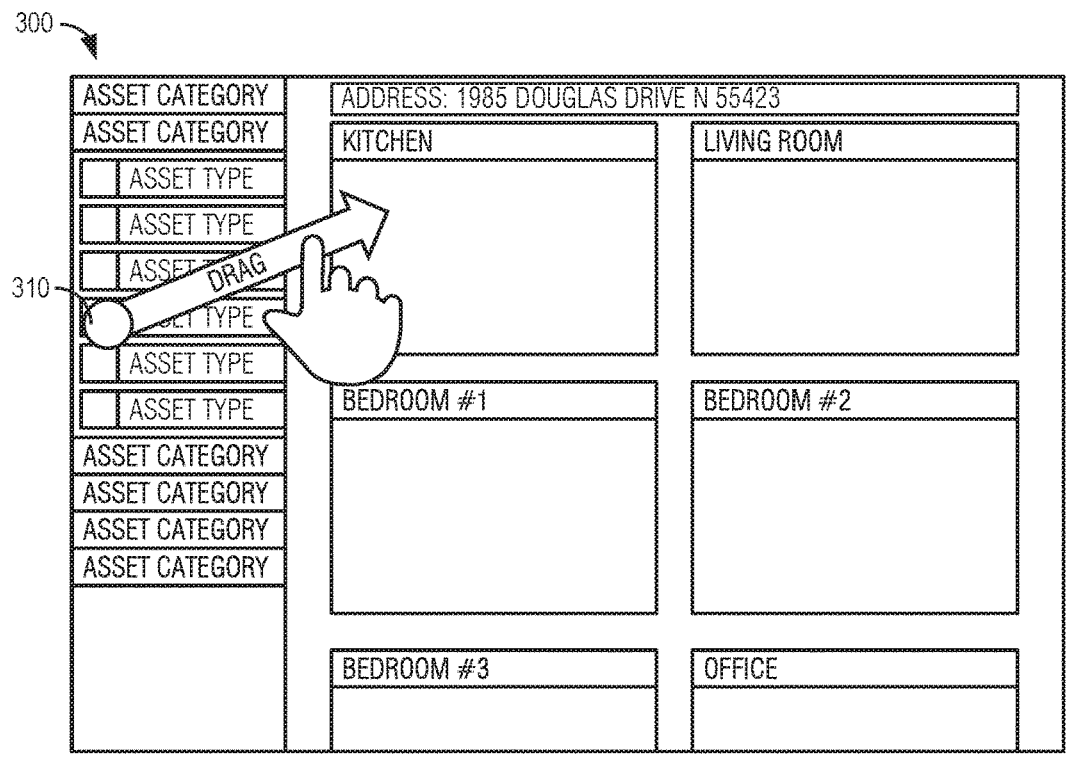
FIG. 3 shows tablet-based visual asset allocation using the home customization GUI according to an example embodiment.

FIG. 3 shows tablet-based visual asset allocation 300 using the home customization GUI according to an example embodiment. As shown in FIG. 3, one embodiment of the visual asset allocation 300 includes the ability to select and drag 310 an asset from an asset category to a room within the room workspace. When rooms are added to the room workspace, each room may not include assets, or each room may be prepopulated with predefined assets. For example, the kitchen may include assets such as a refrigerator, range, and dishwasher. To add additional assets to a room, the user may touch the asset name, drag it to the respective room, and drop it in within the room. If an asset is not specified within the library, then the user has the ability to create a custom asset and manually enter the asset parameters (e.g., yearly electricity consumption, etc.).

Figure 4:
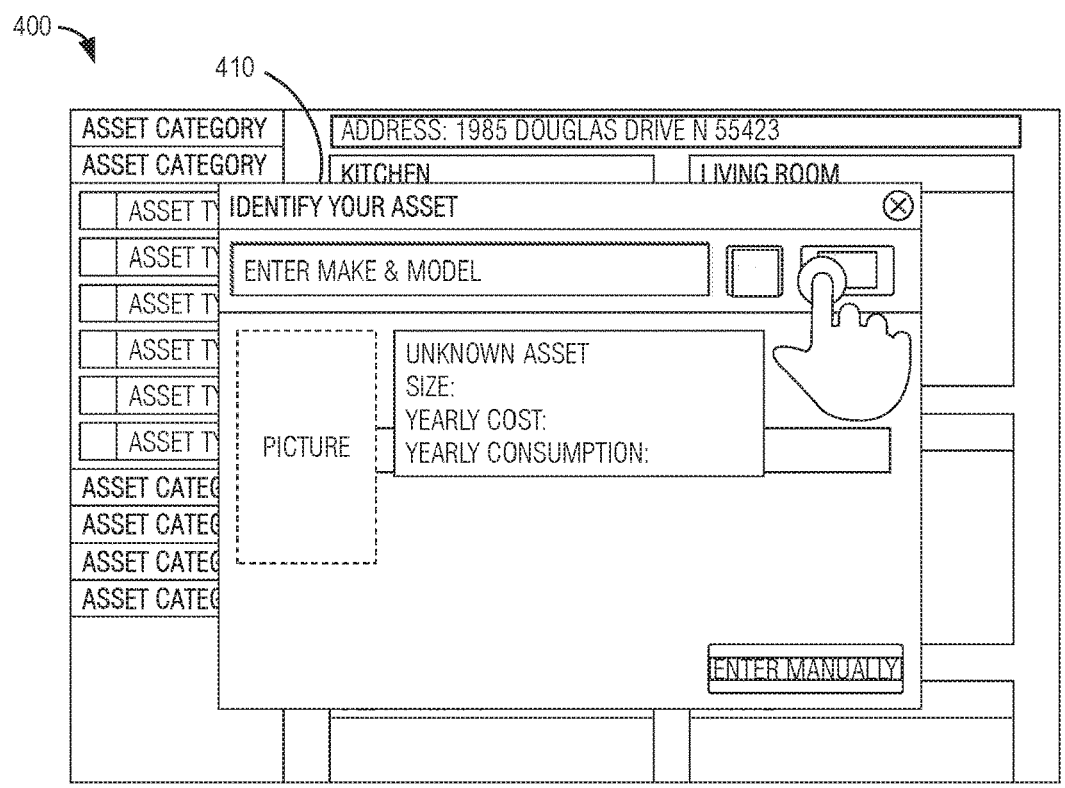
FIG. 4 shows tablet-based initiation of an asset energy audit using the home customization GUI according to an example embodiment.

FIG. 4 shows tablet-based initiation of an asset energy audit 400 using the home customization GUI according to an example embodiment. As shown in FIG. 4, one embodiment of the asset energy audit 400 generates an asset-specific window 410. In an embodiment, the asset-specific window 410 may be generated in response to the user activating (e.g., double-tap, double-click, or tap and hold) an asset icon. To identify the specific make and model of the asset, the user may manually enter the make and model of the asset, or the user may take a picture of the model number barcode or model number sticker. Image analysis may be used to read the barcode, or OCR may be used to recognize the textual characters in the model number sticker. The model number information may be used to retrieve further information about the asset and its energy usage properties.

FIGS. 5-24 show a phone-based home customization graphical user interface (GUI) 500-2400 according to an example embodiment. The embodiments shown in FIGS. 5-24 provide a home customization GUI 500-2400 that is applicable to any of the mobile devices that may be used to implement one or more of the described methods and interfaces. While the GUI may be described as being responsive to touchscreen input, other input methods may be used. While the GUI may be described or shown in either portrait orientation or landscape orientation, other embodiments may use other orientations.

FIG. 5 shows phone-based home property management GUI 500 according to an example embodiment. As shown in FIG. 5, one embodiment of the home property management GUI 500 includes a button to add a new home 510. The home property management GUI 500 may also include a selectable list of one or more additional homes 520, or may include a button to select a home for deletion 530.

FIG. 6 shows phone-based home locating GUI 600 according to an example embodiment. As shown in FIG. 6, one embodiment of the home locating GUI 600 includes retrieving device-specific location information (e.g., GPS, Wi-Fi location, or other location information), and prompt the user to manually correct the information 610. For example, the application may have correctly identified the street, city, and zip code, but the user may have to correct the house number. Once the address information is correct, the application may prompt the user to confirm the information and continue 620.

FIG. 7 shows phone-based home updating GUI 700 according to an example embodiment. As shown in FIG. 7, one embodiment of the home updating GUI 700 includes a list of selectable home attributes 710. The selectable home attributes may be populated using the address entered in the home updating GUI 700. The address may be resolved against a list of addresses stored on a local drive or remote network. Once the user enters his/her address, the application may extract basic room information about the home from publically available tax records. The application may then create a list of information about those basic rooms, and prompt the user to update one or more of the selectable home attributes 710. If no tax record is found, then the application may create templates of some or all of the rooms, and prompt the user to update the selectable home attributes 710. In some embodiments the user may be able to create custom rooms not specified within the application.

FIG. 8 shows phone-based energy asset and audit management GUI My Utility Bill selection 800 according to an example embodiment. As shown in FIG. 8, an embodiment of the asset and audit management GUI 800 allows the user to select My Utility Bill 810.

FIG. 9 shows phone-based utility bill display 900 using the home customization GUI according to an example embodiment. As shown in FIG. 9, one embodiment of the utility bill display 900 includes a button 910 to access the user's utility bill. The utility bill screen may include information about the daily savings 910. The daily savings 910 may be compared to a baseline energy consumption value, where the baseline energy consumption value is calculated using asset information provided when the user updated home information 710, or where the baseline energy consumption value is calculated using previous bills. The utility bill display 900 may also include the number of energy points the user has accumulated 920, and the units of the points 930. In various embodiments, the user may earn points by completing an energy audit process. For example, for each asset that a user audits, the user collects more points. If a user has an energy-efficient asset, then the user collects additional points. One embodiment of the utility bill display 900 includes monthly usage 940. The monthly usage 940 may include a graphical representation of the current monthly usage as a portion of the total goal monthly usage 950. The monthly usage 940 may include a graphical representation of the historical monthly usage over the previous months 960.

FIG. 10 shows phone-based Energy Rewards Point Program notification 1000 according to an example embodiment. As shown in FIG. 10, one embodiment of the Energy Rewards Point Program notification 1000 may include a list of various features of the program. The Energy Rewards Point Program notification 1000 may appear upon selecting the point accumulated button 920 in FIG. 9, or may appear based on other events. In some embodiments, users may earn points in the Energy Rewards Point Program by completing the energy analysis, making energy efficient improvements, or sharing energy savings with others. Users may redeem points for credits toward a utility bill.

Figures 11, 12, 13:
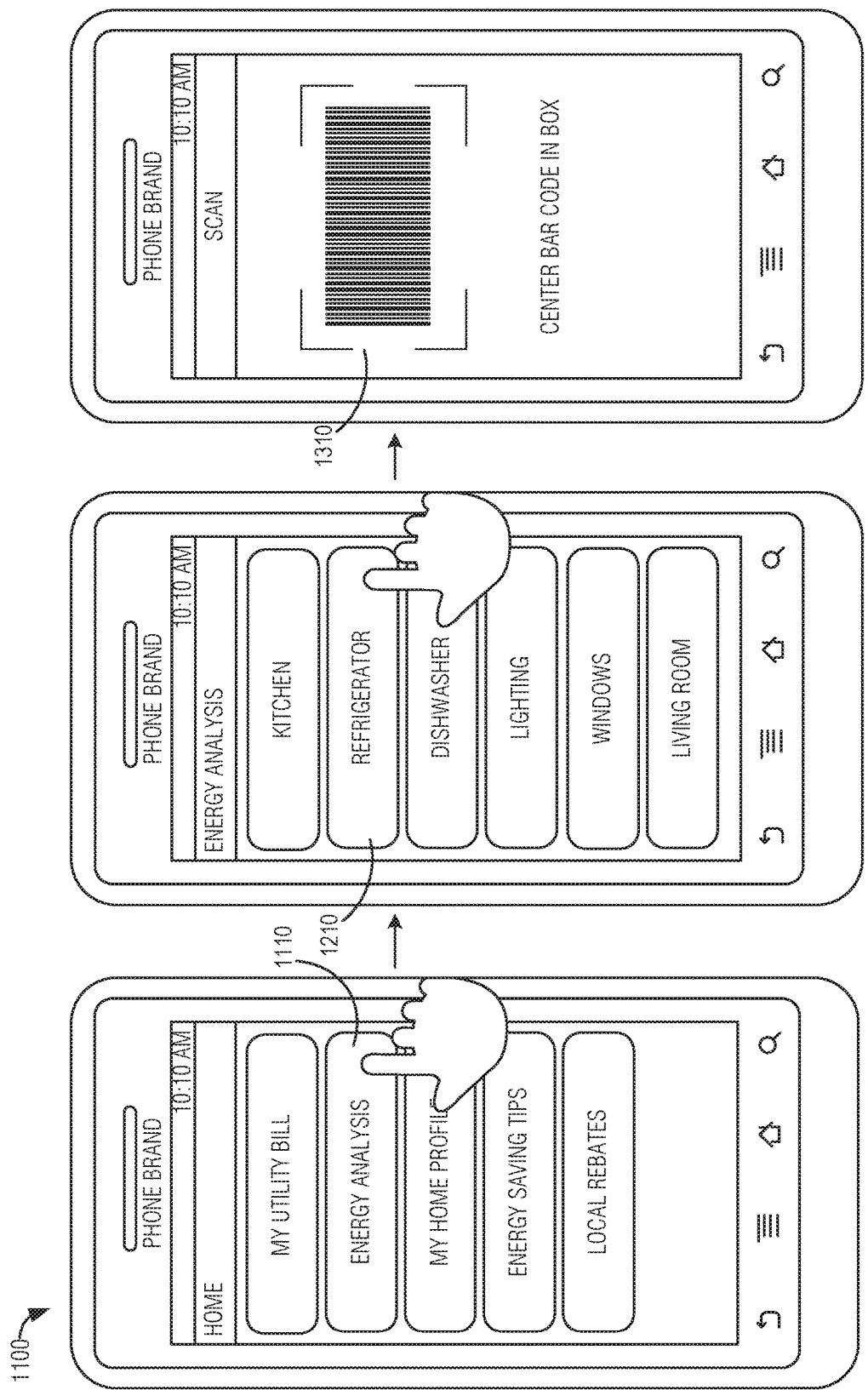
FIG. 11 shows phone-based energy asset and audit management GUI Energy Analysis selection according to an example embodiment.
FIG. 12 shows phone-based Energy Analysis asset selection GUI according to an example embodiment.
FIG. 13 shows phone-based Energy Analysis scanning GUI according to an example embodiment.

FIG. 11 shows phone-based energy asset and audit management GUI Energy Analysis selection 1100 according to an example embodiment. As shown in FIG. 11, an embodiment of the asset and audit management GUI 1100 allows the user to select Energy Analysis 1100.

FIG. 12 shows phone-based Energy Analysis asset selection GUI 1200 according to an example embodiment. As shown in FIG. 12, an embodiment of the asset selection GUI 1200 prompts a user to select from between or among energy-consuming assets associated with the home information. In an example, a user may select a refrigerator 1210, as is shown in FIG. 13.

FIG. 13 shows phone-based Energy Analysis scanning GUI 1300 according to an example embodiment. In an embodiment, the application augments the audit data entered by the user. For example, a user may enter a portion of the audit information (e.g., take a picture of model number, enter the number of light bulbs, confirm a GPS-derived address). As shown in FIG. 13, an embodiment of the Energy Analysis scanning GUI 1300 prompts a user to center a bar code 1310 of a device within a box displayed on screen.

FIG. 14 shows phone-based asset profile GUI 1400 according to an example embodiment. Once the asset has been identified, the application may use internet resources or built-in asset information (e.g., databases) to retrieve detailed, accurate data (e.g., home characteristics, asset energy consumption). In contrast with other audit applications that use approximate data (e.g., based on refrigerator size and age), this application may improve auditing accuracy by using specific data (e.g., refrigerator information based on make and model). As shown in FIG. 14, an embodiment of the asset profile GUI 1400 may display a message 1410 indicating whether the asset is energy efficient. The asset profile GUI 1400 may include a display of information 1420 contained within the asset profile, such as a picture of the asset, a model number, a size, an estimated yearly cost, or an estimated yearly energy consumption. The asset profile GUI 1400 may also include one or more buttons 1430. The buttons 1430 may include a reminder button to set a reminder to reevaluate the energy consumption of the asset, a website button to visit a website with additional details about the asset, or an options button to edit asset profile options, as is shown in FIG. 15.

FIG. 15 shows phone-based asset profile post-audit actions GUI 1500 according to an example embodiment. The asset profile post-audit actions GUI 1500 may be invoked by selecting the options button in FIG. 14, may be invoked by rotating the device from portrait to landscape mode, or may be invoked by other means. As shown in FIG. 15, an embodiment of the asset profile post-audit actions GUI 1500 may be displayed in landscape mode, but other embodiments may display in portrait mode.

After the user has entered information about the asset (e.g., make or model) and this information is stored, then this information can be used to guide various post-audit actions. The asset profile post-audit actions GUI 1500 may display a message 1510 indicating whether the asset is energy efficient and a display of information contained within the asset profile. The asset profile options GUI 1500 may also include one or more post-audit actions buttons 1520. The buttons 1520 may include a button to edit or change the asset information, such as if he or she replaces the asset. The post-audit action buttons 1520 may include a button to order parts specific to the asset, either online or by locating a local repair shop or technician. For example, an HVAC system may require air filters, or some refrigerators may require water filers. The post-audit action buttons 1520 may include connecting to the manufacturer's website to find manuals, or connecting to the Energy Star's website to find out more about the asset's energy consumption.

FIG. 16 shows phone-based energy asset and audit management GUI My Home Profile selection 1600 according to an example embodiment. As shown in FIG. 16, an embodiment of the asset and audit management GUI 1600 allows the user to select My Home Profile 1610, as is shown in FIG. 17.

FIG. 17 shows phone-based My Home Profile portrait-mode GUI 1700 according to an example embodiment. As shown in FIG. 17, an embodiment of the My Home Profile portrait-mode GUI 1700 allows the user to view assets that they have added to the home profile. By selecting a specific asset, the user may view options for increasing the efficiency of the asset and earning Energy Rewards points. For example, a user may select the kitchen 1700, and the My Home Profile GUI 1700 may display one or more asset-specific icons, where the icons may include information about increasing the efficiency of the refrigerator 1720 or the dishwasher 1730. The refrigerator icon 1720 may suggest replacing the water filter, and indicate that the user could earn ten Energy Rewards points. The dishwasher icon 1730 may suggest turning off heated drying, and indicate that the user could earn five Energy Rewards points. Selecting one of the asset-specific icons may provide additional information about improving the efficiency of that asset, or may enable the user to purchase asset components.

Figure 18:
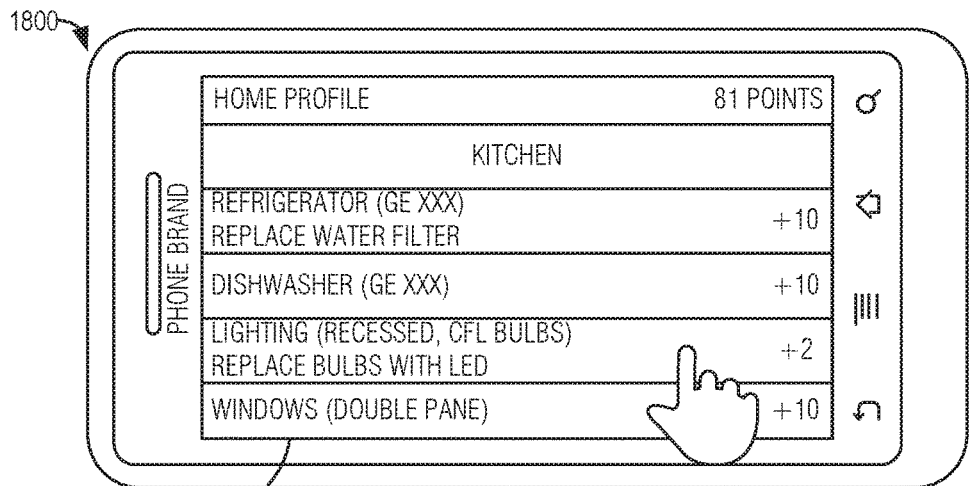
FIG. 18 shows phone-based My Home Profile landscape-mode GUI according to an example embodiment.

FIG. 18 shows phone-based My Home Profile landscape-mode GUI 1800 according to an example embodiment. The My Home Profile landscape-mode GUI 1800 may be invoked by selecting My Home profile 1610 in FIG. 16, may be invoked by rotating the device from portrait to landscape mode, or may be invoked by other means. As shown in FIG. 18, an embodiment of the My Home Profile landscape-mode GUI 1800 allows the user to view a list of assets 1810 that they have added to the home profile. From here, the user can view energy warnings or view suggested updates to their home. Each asset may be listed with information about increasing the efficiency of the asset and earning Energy Rewards points. For example, the user may be prompted to replace bulbs with LED bulbs. Each asset may be selectable, and may provide additional information about the asset in a notification window, such as shown in FIG. 19.

Figure 19:
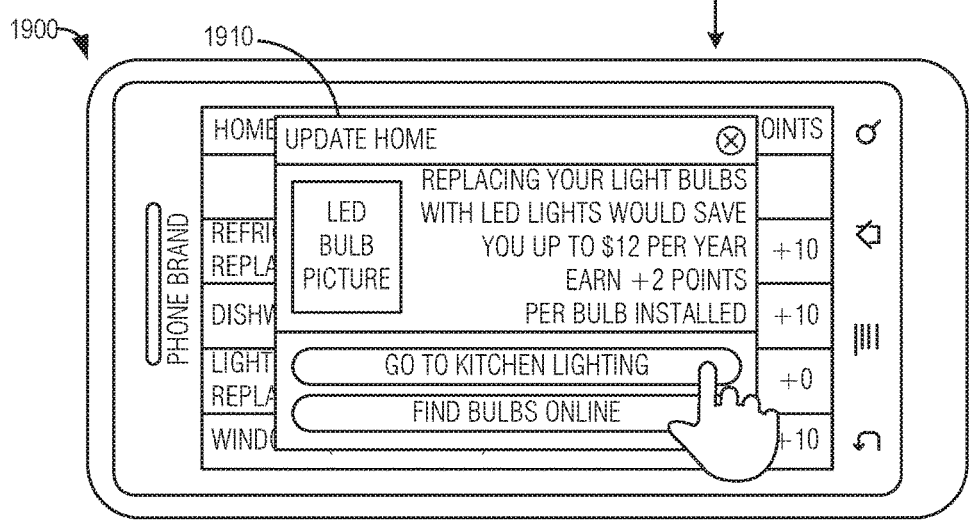
FIG. 19 shows phone-based appliance-specific point reward notification according to an example embodiment.

FIG. 19 shows phone-based appliance-specific point reward notification 1900 according to an example embodiment. As shown in FIG. 19, an embodiment of the appliance-specific point reward notification 1900 may include additional information about the asset efficiency improvement. The notification 1910 may include instructions for improving the efficiency of the asset, information about how much money can be saved, or information about how many points can be earned. The notification 1910 may include one or more selectable options, such as an option to modify the asset or to purchase replacement assets online.

Figure 20:
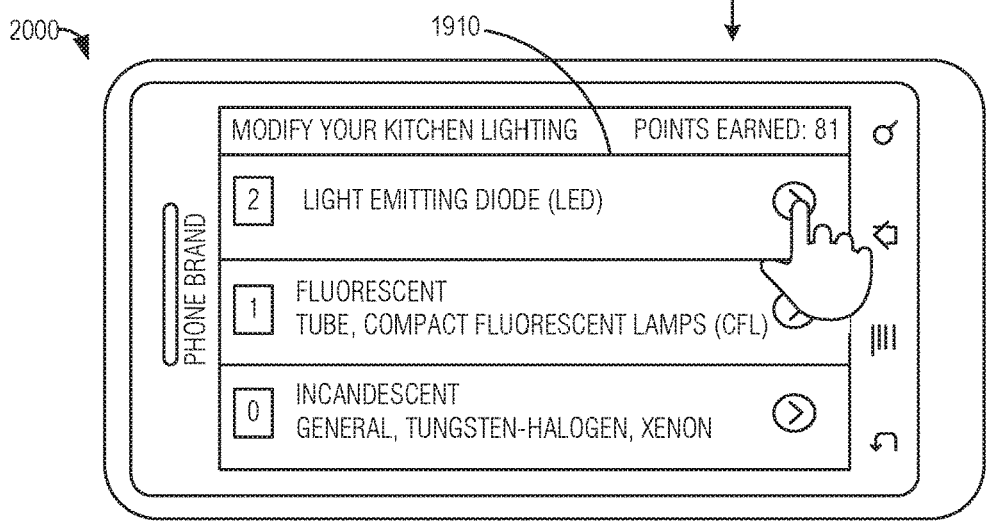
FIG. 20 shows phone-based room-specific asset modification GUI according to an example embodiment.

FIG. 20 shows phone-based room-specific asset modification GUI 2000 according to an example embodiment. An embodiment of the room-specific asset modification GUI 2000 allows the user to view and modify assets within a room. As shown in FIG. 20, the asset modification GUI 2000 may include a list of selectable assets 1910. The list of selectable assets 1910 may include assets that have been added to the room, or may include assets that may be used to replace assets currently in the room. For example, the list of selectable assets 1910 may include the kitchen's current CFL bulbs, and may include a light emitting diode (LED) asset. The list of selectable assets 1910 may include information, such as points that may be earned, energy consumption warnings, or other information. By selecting an asset, the user can indicate which asset will be used in a location. For example, the user may select the LED asset to indicate replacement of the CFL lighting by LED lighting.

FIG. 21 shows phone-based energy asset and audit management GUI Energy Saving Tips selection 2100 according to an example embodiment. As shown in FIG. 21, an embodiment of the asset and audit management GUI 2100 allows the user to select Energy Saving Tips 2110, as is shown in FIG. 22.

FIG. 22 shows phone-based Energy Saving Tips GUI 2200 according to an example embodiment. As shown in FIG. 22, an embodiment of the Energy Saving Tips GUI 2200 allows the user to view one or more selectable Energy Saving Tips 2210. The Energy Saving Tips GUI 2200 may enable a user to filter the selectable Energy Saving Tips 2210, such as by cost of implementation, savings, or other filer criteria. The selectable Energy Saving Tips 2210 may include an expected cost of implementation of the tip. The selectable Energy Saving Tips 2210 may include an expected savings, where the expected savings may be a qualitative or quantitative estimate of savings expected upon implementation of the tip. In an embodiment, qualitative or quantitative savings may be indicated on a scale of one to five, and the savings may indicate the relative savings of each tip compared to other tips. For example, if upgrading the dishwasher is determined to save more money than other tips, then it may be ranked five out of five to indicate the maximum possible savings. In an embodiment, quantitative savings may be determined by converting a calculated dollar value of savings to a value between one and five. For example, if upgrading the dishwasher is determined to save more than $100, then it may be ranked five out of five to indicate a savings of more than $100. In an embodiment, the selectable Energy Saving Tips 2210 may perform various actions upon selection of each tip. For example, selecting a dishwasher upgrade may open a webpage to search dishwasher models, selecting a thermostat scheduling may open a webpage or document to provide thermostat scheduling instructions, or selecting LED lights may open a webpage or other shopping application to enable purchase of LED lights online.

FIG. 23 shows phone-based energy asset and audit management GUI Local Rebates selection 2300 according to an example embodiment. As shown in FIG. 23, an embodiment of the asset and audit management GUI 2300 allows the user to select Local Rebates 2310, as is shown in FIG. 24.

FIG. 24 shows phone-based energy asset and audit management rebate display and selection GUI 2400 according to an example embodiment. As shown in FIG. 24, an embodiment of the rebate display and selection GUI 2400 may display selectable Local Rebates 2410. The rebate display and selection GUI 2400 may enable a user to filter the selectable Local Rebates 2410, such as by popularity, rebate issuer, rebate value, or other filter criteria. Each of the selectable Local Rebates 2410 may include information about each rebate, including a title, issuer of the rebate, value of the rebate, or other information. An embodiment of the rebate display and selection GUI 2400 may enable a user to view, print, or email 2420 one or more rebates.

Figure 25:
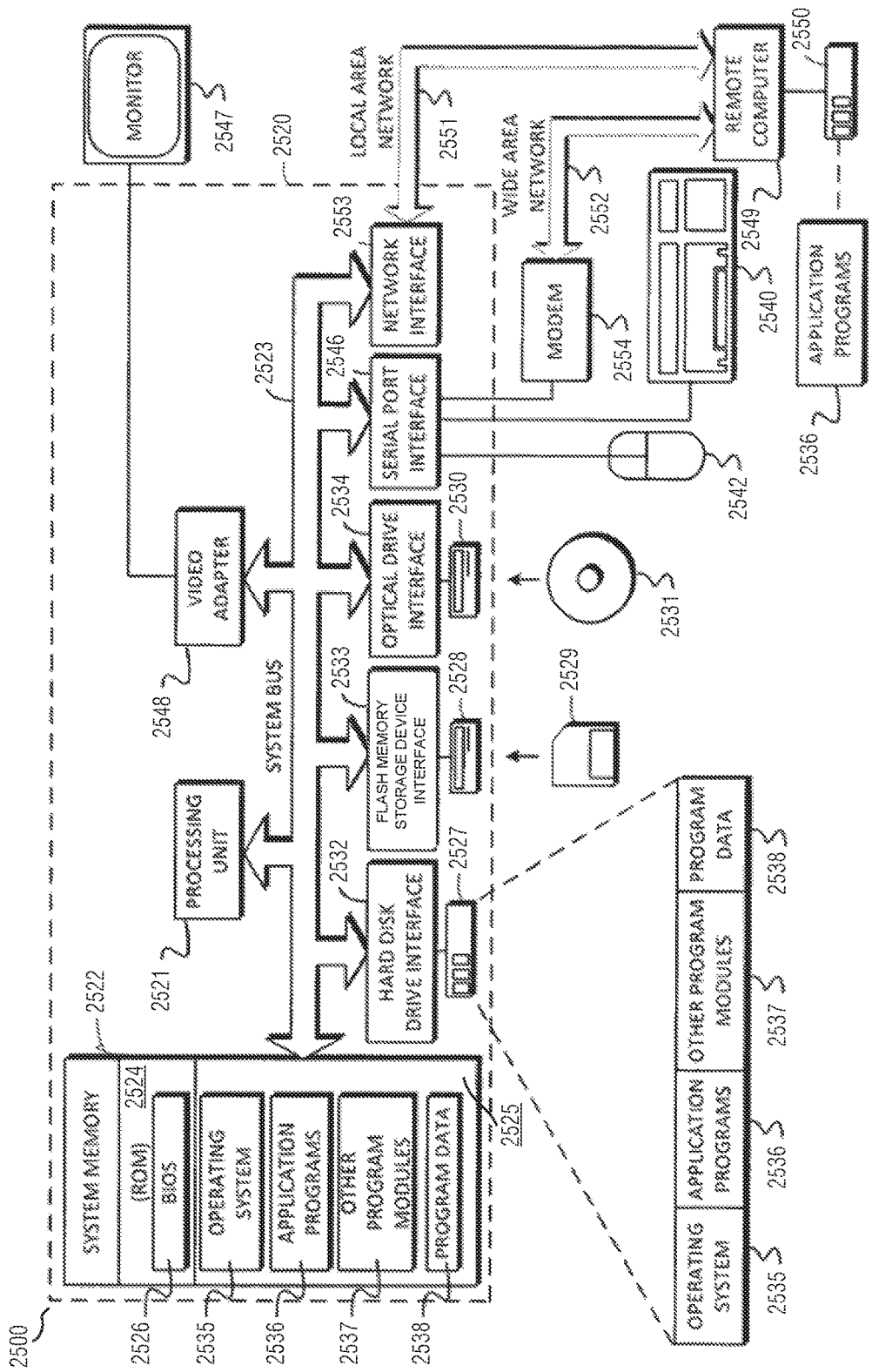
FIG. 25 is a block diagram of a computer system to implement methods according to an example embodiment.

FIG. 25 is a block diagram of a computer system 2500 to implement methods according to an example embodiment. In the embodiment shown in FIG. 25, a hardware and operating environment is provided that is applicable to any of the mobile devices that may be used to implement one or more of the described methods and interfaces.

As shown in FIG. 25, one embodiment of the hardware and operating environment includes a general purpose computing device in the form of a computer 2500 (e.g., a personal computer, workstation, or server), including one or more processing units 2521, a system memory 2522, and a system bus 2523 that operatively couples various system components including the system memory 2522 to the processing unit 2521. There may be only one or there may be more than one processing unit 2521, such that the processor of computer 2500 comprises a single central-processing unit (CPU), or a plurality of processing units, commonly referred to as a multiprocessor or parallel-processor environment. In various embodiments, computer 2500 is a conventional computer, a distributed computer, or any other type of computer.

The system bus 2523 can be any of several types of bus structures including a memory bus or memory controller, a peripheral bus, and a local bus using any of a variety of bus architectures. The system memory can also be referred to as simply the memory, and, in some embodiments, includes read-only memory (ROM) 2524 and random-access memory (RAM) 2525. A basic input/output system (BIOS) program 2526, containing the basic routines that help to transfer information between elements within the computer 2500, such as during start-up, may be stored in ROM 2524. The computer 2500 further includes a hard disk drive 2527 for reading from and writing to a hard disk, not shown, a magnetic disk drive 2528 for reading from or writing to a removable magnetic disk 2529, and an optical disk drive 2530 for reading from or writing to a removable optical disk 2531 such as a CD ROM or other optical media.

The hard disk drive 2527, magnetic disk drive 2528, and optical disk drive 2530 couple with a hard disk drive interface 2532, a magnetic disk drive interface 2533, and an optical disk drive interface 2534, respectively. The drives and their associated computer-readable media provide non-volatile storage of computer-readable instructions, data structures, program modules, and other data for the computer 2500. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 2529, optical disk 2531, ROM 2524, or RAM 2525, including an operating system 2535, one or more application programs 2536, other program modules 2537, and program data 2538. Programming for implementing one or more processes or method described herein may be resident on any one or number of these computer-readable media.

A user may enter commands and information into computer 2500 through input devices such as a keyboard 2540 and pointing device 2542. Other input devices (not shown) can include a microphone, joystick, game pad, satellite dish, scanner, or the like. These other input devices are often connected to the processing unit 2521 through a serial port interface 2546 that is coupled to the system bus 2523, but can be connected by other interfaces, such as a parallel port, game port, or a universal serial bus (USB). A monitor 2547 or other type of display device can also be connected to the system bus 2523 via an interface, such as a video adapter 2548. The monitor 2547 can display a graphical user interface for the user. In addition to the monitor 2547, computers typically include other peripheral output devices (not shown), such as speakers and printers.

The computer 2500 may operate in a networked environment using logical connections to one or more remote computers or servers, such as remote computer 2549. These logical connections are achieved by a communication device coupled to or a part of the computer 2500; the invention is not limited to a particular type of communications device. The remote computer 2549 can be another computer, a server, a router, a network PC, a client, a peer device or other common network node, and typically includes many or all of the elements described above I/O relative to the computer 2500, although only a memory storage device 2550 has been illustrated. The logical connections depicted in FIG. 25 include a local area network (LAN) 2551 and/or a wide area network (WAN) 2552. Such networking environments are commonplace in office networks, enterprise-wide computer networks, intranets and the internet, which are all types of networks.

When used in a LAN-networking environment, the computer 2500 is connected to the LAN 2551 through a network interface or adapter 2553, which is one type of communications device. In some embodiments, when used in a WAN-networking environment, the computer 2500 typically includes a modem 2554 (another type of communications device) or any other type of communications device, e.g., a wireless transceiver, for establishing communications over the wide-area network 2552, such as the internet. The modem 2554, which may be internal or external, is connected to the system bus 2523 via the serial port interface 2546. In a networked environment, program modules depicted relative to the computer 2500 can be stored in the remote memory storage device 2550 of remote computer, or server 2549. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The following statements are potential examples that may be converted to claims in a future application. No modification of the following statements should be allowed to affect the interpretation of claims that may be drafted when this provisional application is converted into a regular utility application.

Example 1 includes a method comprising receiving a selection of a building via a touchscreen interface, identifying a plurality of rooms based on a stored data record associated with the selected building, populating the touchscreen interface with visual representations of the plurality of rooms of the selected building, receiving a selection of a room via the touchscreen interface, identifying a plurality of predefined objects associated with the selected room, providing a list of the plurality of predefined objects on the touchscreen interface in a manner facilitating selection of an asset for the selected room via the touchscreen interface, facilitating entry of make and model information of the selected asset via the touchscreen interface, and retrieving estimated energy usage information based on the make and model information of the selected asset from a database of building objects via a network connection.

Example 2 the example of example 1 wherein populating the touchscreen interface with visual representations of rooms includes retrieving tax records to identifying rooms to include.

Example 3 the example of example 2 and further comprising facilitating selection of additional rooms from a rooms menu to drag to a room workspace.

Example 4 the example of example 1 and further comprising providing a list of predefined objects as a function of objects likely to be found in each type of room.

Example 5 the example of example 1 wherein the objects include energy consuming objects.

Example 6 the example of example 1 and further comprising providing an interface to facilitate entry of asset types not found in the provided list of objects.

Example 7 the example of example 1 wherein data identifying the rooms and objects is stored in cloud storage via the network connection.

Example 8 the example of example 1 and further comprising providing an interface to facilitate capture of make and model information of an asset selected for the selected room via a camera using image recognition of a model number sticker, and retrieving further information about the asset and its energy usage properties from remote storage via a network based on the recognition of the model number sticker.

Example 9 the example of example 1 and further comprising performing an energy usage analysis based on collected data identifying the rooms and objects.

Example 10 the example of example 9 wherein the energy usage analysis includes a connection to a utility company to view a utility bill, an energy analysis, and energy saving tips based on the collected data.

Example 11 the example of example 9 wherein the energy usage analysis includes identification of local rebates available.

Example 12 the example of example 1 further including receiving device-specific location information from a device associated with the touchscreen interface, and generating a prompted address based on the device-specific location information, wherein receiving the selection of the building includes confirming the prompted address.

Example 13 includes a computer readable storage device having instructions for causing a mobile device to execute a method, the method comprising: receiving a selection of a building via a touchscreen interface, identifying a plurality of rooms based on a stored data record associated with the selected building, populating the touchscreen interface with visual representations of the plurality of rooms of the building, receiving a selection of a room via the touchscreen interface, identifying a plurality of predefined objects associated with the selected room, providing a list of the plurality of predefined objects on the touchscreen interface in a manner facilitating use of the touchscreen to select an asset for the selected room, facilitating entry of make and model information of the selected asset via the touchscreen interface, and retrieving estimated energy usage information based on the make and model information of the selected asset from a database of building objects via a network connection.

Example 14 includes the computer readable storage device of example 13, the method further including receiving device-specific location information from a device associated with the touchscreen interface, and generating a prompted address based on the device-specific location information, wherein receiving the selection of the building includes confirming the prompted address.

Example 15 includes a device comprising a processor, a storage device to store code to execute on the processor, a touchscreen to display graphical representations of rooms and objects and to facilitate user input via screen touches and gestures, wherein the code executing on the processor causes the device to perform a method comprising receiving a selection of a building via a touchscreen interface, identifying a plurality of rooms based on a stored data record associated with the selected building, populating the touchscreen with visual representations of rooms of the building, receiving a selection of a room via the touchscreen interface, identifying a plurality of predefined objects associated with the selected room, providing a list of the plurality of predefined objects on the touchscreen interface in a manner facilitating use of the touchscreen to select an asset for a visual representation of the selected room, facilitating entry of make and model information of the selected asset via the touchscreen interface, and retrieving estimated energy usage information based on the make and model information of the selected asset from a database of building objects via a network connection.

Example 16 includes the device of example 15, wherein the code further causes the device to perform the method comprising receiving device-specific location information from a device associated with the touchscreen interface, and generating a prompted address based on the device-specific location information, wherein receiving the selection of the building includes confirming the prompted address.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:
1. A method comprising:
receiving a selection of a building via a touchscreen interface;

identifying, responsive to receipt of the building selection, a plurality of rooms based on a stored data record associated with the selected building;

populating, responsive to identification of the plurality of rooms, the touchscreen interface with visual representations of the plurality of rooms of the selected building;

receiving a selection of a room within the plurality of rooms via the touchscreen interface;

identifying a plurality of predefined assets associated with the selected room;

providing a list of the plurality of predefined assets on the touchscreen interface in a manner facilitating selection of an asset for the selected room via the touchscreen interface;

facilitating entry of make and model information of the selected asset via the touchscreen interface; and retrieving estimated energy usage information based on the make and model information of the selected asset from a database of building assets via a network connection.

2. The method of claim 1 wherein populating the touchscreen interface with visual representations of rooms includes retrieving tax records to identify rooms to include.

3. The method of claim 2 and further comprising facilitating selection of additional rooms from a rooms menu to drag to a room workspace.

4. The method of claim 1 and further comprising providing a list of predefined assets as a function of assets likely to be found in each type of room.

5. The method of claim 1 wherein the assets include energy consuming assets.

6. The method of claim 1 and further comprising providing an interface to facilitate entry of asset types not found in the provided list of assets.

7. The method of claim 1 wherein the database of building assets is stored in cloud storage via the network connection.

8. The method of claim 1 and further comprising providing an interface to facilitate capture of make and model information of an asset selected for the selected room via a camera using image recognition of a model number sticker, and retrieving further information about the asset and its energy usage properties from remote storage via a network based on the recognition of the model number sticker.

9. The method of claim 1 and further comprising performing an energy usage analysis based on collected data identifying the rooms and assets.

10. The method of claim 9 wherein the energy usage analysis includes a connection to a utility company to view a utility bill, an energy analysis, and energy saving tips based on the collected data.

11. The method of claim 9 wherein the energy usage analysis includes identification of local rebates available.

12. The method of claim 1 and further comprising:
receiving device-specific location information from a device associated with the touchscreen interface; and
generating a prompted address based on the device-specific location information;
wherein receiving the selection of the building includes confirming the prompted address.

13. A non-transitory, computer-readable storage medium having instructions stored thereon for causing a smart phone executing the instructions to carry out a method, the method comprising:
receiving a selection of a building via a touchscreen interface of the smart phone;
identifying, responsive to receipt of the building selection, a plurality of rooms based on a stored data record associated with the selected building;
populating, responsive to identification of the plurality of rooms, the touchscreen interface of the smart phone with visual representations of the plurality of rooms of the building;
receiving a selection of a room within the plurality of rooms via the touchscreen interface of the smart phone;
identifying a plurality of predefined assets associated with the selected room;
providing a list of the plurality of predefined assets on the touchscreen interface of the smart phone in a manner facilitating use of the touchscreen to select an asset for the selected room;
facilitating entry of make and model information of the selected asset via the touchscreen interface of the smart phone; and
retrieving estimated energy usage information based on the make and model information of the selected asset from a database of building assets via a network connection.

14. The non-transitory, computer-readable storage medium of claim 13, the method further including:
receiving device-specific location information from a device associated with the touchscreen interface of the smart phone; and
generating a prompted address based on the device-specific location information;
wherein receiving the selection of the building includes confirming the prompted address.

15. A device comprising:
a processor;
a storage device to store code to execute on the processor;
a touchscreen interface to display graphical representations of rooms and assets and to facilitate user input via screen touches and gestures;
wherein the code executing on the processor causes the device to perform a method comprising:
receiving a selection of a building via a touchscreen interface;
identifying, responsive to receipt of the building selection, a plurality of rooms based on a stored data record associated with the selected building;
populating, responsive to identification of the plurality of rooms, the touchscreen interface with visual representations of rooms of the building;
receiving a selection of a room within the plurality of rooms via the touchscreen interface;
identifying a plurality of predefined assets associated with the selected room;
providing a list of the plurality of predefined assets on the touchscreen interface in a manner facilitating use of the touchscreen interface to select an asset for a visual representation of the selected room;
facilitating entry of make and model information of the selected asset via the touchscreen interface; and
retrieving estimated energy usage information based on the make and model information of the selected asset from a database of building assets via a network connection.

16. The device of claim 15, wherein the code further causes the device to perform the method comprising:
receiving device-specific location information from a device associated with the touchscreen interface; and
generating a prompted address based on the device-specific location information;

wherein receiving the selection of the building includes confirming the prompted address.

* * * * *